(12) United States Patent
Sinha

(10) Patent No.: US 12,074,921 B2
(45) Date of Patent: Aug. 27, 2024

(54) MANAGING IP MULTIMEDIA SUBSYSTEM (IMS) REGISTRATION

(71) Applicant: Charter Communications Operating, LLC, St. Louis, MO (US)

(72) Inventor: Ashutosh Kumar Sinha, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 308 days.

(21) Appl. No.: 17/521,564

(22) Filed: Nov. 8, 2021

(65) Prior Publication Data

US 2023/0141522 A1    May 11, 2023

(51) Int. Cl.
*H04L 65/1073*    (2022.01)
*H04L 65/1016*    (2022.01)
(Continued)

(52) U.S. Cl.
CPC ...... *H04L 65/1073* (2013.01); *H04L 65/1016* (2013.01); *H04W 4/025* (2013.01); *H04W 8/08* (2013.01); *H04W 60/00* (2013.01)

(58) Field of Classification Search
CPC ............ H04L 65/1073; H04L 65/1016; H04L 65/1045; H04L 65/1046; H04W 4/025;
(Continued)

(56) References Cited

U.S. PATENT DOCUMENTS 6,654,606 B1 * 11/2003 Foti .................... H04W 8/12
455/445

7,818,002 B2 * 10/2010 Bajko ................ H04L 65/1104
455/435.2
(Continued)

FOREIGN PATENT DOCUMENTS

CN    100421409 C  *  9/2008
CN    108243403 B  *  1/2021  ......... H04L 65/1016
(Continued)

OTHER PUBLICATIONS

Sang-chul Oh, Chan-yong Lee and Yeon-seung Shin, "The serving CSCF assignment algorithm in wireless IP multimedia networks," 2003 46th Midwest Symposium on Circuits and Systems, Cairo, Egypt, 2003, pp. 440-445 vol. 1, doi: 10.1109/MWSCAS.2003. 1562313. (Year: 2003).*
(Continued)

*Primary Examiner* — Yuwen Pan
*Assistant Examiner* — Swati Jain
(74) *Attorney, Agent, or Firm* — THE MARBURY LAW GROUP, PLLC

(57) ABSTRACT

Various embodiments include network computing devices and methods for computing resource management. Various embodiments include network computing devices and methods for managing IP Multimedia Subsystem (IMS) registration of a user equipment (UE). A processor of a network computing device may send to a home subscriber server (HSS) a user authorization request in response to receiving a registration request from the UE. The processor may receive from the HSS a user authorization answer comprising subscriber location information associated with the UE. The processor may send a registration request to register the UE with a serving CSCF (S-CSCF) based on the subscriber location information and S-CSCF location information.

27 Claims, 9 Drawing Sheets

(51) Int. Cl.
*H04W 4/02* (2018.01)
*H04W 8/08* (2009.01)
*H04W 60/00* (2009.01)

(58) Field of Classification Search
CPC ....... H04W 8/08; H04W 60/00; H04W 12/08; H04W 12/63
See application file for complete search history.

(56) References Cited

U.S. PATENT DOCUMENTS

| | | | | |
|---|---|---|---|---|
| 8,107,957 | B1* | 1/2012 | O'Neil | H04M 3/42229 455/445 |
| 8,438,257 | B2* | 5/2013 | Belinchon Vergara | H04L 69/40 709/221 |
| 8,934,461 | B2 | 1/2015 | Leis et al. | |
| 9,654,964 | B1* | 5/2017 | Carames | H04W 8/12 |
| 9,979,756 | B2* | 5/2018 | Nomani | H04L 65/1073 |
| RE47,773 | E | 12/2019 | Ma et al. | |
| 10,911,500 | B1* | 2/2021 | Rahman | H04L 65/1073 |
| RE49,357 | E* | 1/2023 | Lim | H04W 60/06 |
| 11,659,389 | B1* | 5/2023 | Sabeur | H04W 4/14 455/411 |
| 11,722,891 | B2* | 8/2023 | Nair | H04W 12/06 726/3 |
| 2007/0238467 | A1* | 10/2007 | Buckley | H04M 7/0057 455/445 |
| 2007/0238468 | A1* | 10/2007 | Buckley | H04Q 3/0045 455/445 |
| 2008/0090586 | A1* | 4/2008 | Engelhart | H04L 65/1063 455/433 |
| 2010/0208671 | A1* | 8/2010 | Tamura | H04L 65/1073 370/328 |
| 2011/0009122 | A1* | 1/2011 | Kalavade | H04M 7/006 455/445 |
| 2011/0028130 | A1* | 2/2011 | Swaminathan | H04L 65/1104 455/414.1 |
| 2011/0306339 | A1* | 12/2011 | Walker | H04L 65/1073 455/432.3 |
| 2012/0115432 | A1* | 5/2012 | Blanco | H04L 65/40 455/404.1 |
| 2013/0089087 | A1* | 4/2013 | Lu | H04L 65/1016 370/352 |
| 2013/0212284 | A1* | 8/2013 | Milinski | H04W 8/12 709/226 |
| 2013/0272253 | A1* | 10/2013 | Veenstra | H04W 72/52 370/329 |
| 2015/0181033 | A1* | 6/2015 | Keller | H04L 65/1036 455/404.1 |
| 2017/0026927 | A1* | 1/2017 | Siegel | H04L 65/1095 |
| 2018/0007612 | A1* | 1/2018 | Jahangir | H04L 61/503 |
| 2018/0332555 | A1* | 11/2018 | Kunz | H04W 8/20 |
| 2018/0352528 | A1* | 12/2018 | Kunz | H04M 15/8038 |
| 2019/0335534 | A1* | 10/2019 | Atarius | H04L 65/1016 |
| 2020/0396262 | A1* | 12/2020 | Al-Mehdar | H04L 65/00 |
| 2022/0006845 | A1* | 1/2022 | Zaifuddin | H04W 8/04 |
| 2022/0094721 | A1* | 3/2022 | Nayak | H04L 65/1073 |
| 2022/0124091 | A1* | 4/2022 | Corona | H04L 65/1069 |
| 2022/0210206 | A1* | 6/2022 | Albasheir | H04L 65/1073 |
| 2022/0248253 | A1* | 8/2022 | Sabeur | H04L 65/1016 |
| 2022/0338152 | A1* | 10/2022 | Foti | H04L 65/1073 |
| 2023/0058147 | A1* | 2/2023 | Foti | H04W 36/14 |
| 2023/0062145 | A1* | 3/2023 | Sabeur | H04W 8/20 |
| 2023/0088323 | A1* | 3/2023 | Al-Mehdar | H04L 65/1104 |

FOREIGN PATENT DOCUMENTS

| | | | | |
|---|---|---|---|---|
| CN | 112738848 | A * | 4/2021 | ............ H04W 28/08 |
| CN | 112738848 | B * | 12/2022 | ............ H04W 28/08 |
| WO | WO-2019170253 | A1 * | 9/2019 | |

OTHER PUBLICATIONS

Transmission delay reduction in IMS by re-registration procedure modification, Farahbakhsh, R.; Varposhti, M.; Movahhedinia, N.. Proceedings—The 2nd International Conference on Next Generation Mobile Applications, Services, and Technologies, NGMAST 2008: 142-146. IEEE Computer Society. (Dec. 1, 2008) (Year: 2008).*

Nagy L, Novotny V, Uramova J, Makhlouf N. Performance Analysis of IMS Network: The Proposal of New Algorithms for S-CSCF Assignment. Advances in Electrical & Electronic Engineering. 2013;11(5):365-372. doi:10.15598/aeee.v1115.886 (Year: 2013).*

3GPP TS 23.228, "3rd Generation Partnership Project; Technical Specification Group Services and System Aspects; IP Multimedia Subsystem (IMS); Stage 2, (Release 17)", V17.1.0, 353 pages, (Jun. 2021).

3GPP TS 23.380, "3rd Generation Partnership Project; Technical Specification Group Core Network and Terminals; IMS Restoration Procedures, (Release 16)", V16.4.0, 57 pages, (Jun. 2021).

3GPP TS 29.229, "3rd Generation Partnership Project; Technical Specification Group Core Network and Terminals; Cx and Dx interfaces based on the Diameter protocol; Protocol details, (Release 16)", V16.2.0, 42 pages, (Jun. 2020).

* cited by examiner

MANAGING IP MULTIMEDIA SUBSYSTEM (IMS) REGISTRATION

BACKGROUND

The Internet Protocol (IP) Multimedia Subsystem (IMS) is a network architecture for delivering communication services built on the Internet Protocol. Network functions of the IMS are typically configured to set up, establish, modify, and tear down multimedia sessions. Functional elements of the IMS may be configured to handle Session Initiation Protocol (SIP) signaling traffic and Diameter protocol signaling for policy control and billing. Network service providers may leverage IMS-based core network infrastructure to enable services such as voice over LTE (VOLTE) and other communications applications and services.

The IMS assigns an instance of a control function (i.e., a hardware/software instantiation of a call serving control function that may be executed on a network computing device) to a user equipment (UE). The assigned instance of the control function may perform session control functions for the UE while the UE is registered with the IMS. An IMS may include numerous instances of such control functions, which may be geographically dispersed throughout the network (i.e., executed on network computing devices that may be geographically dispersed throughout the network). Conventionally, there are insufficient controls over the assignment of control functions to a UE. In some instances, the IMS may assign a control function to a UE wherein the control function (executed on a network computing device) that is geographically distant from the UE. For example, in instances in which a UE's primary control function is unavailable or unreachable, a call request for the UE may be assigned to another control function that is geographically distant from the UE. As a consequence, in such instances in which the control function is geographically distant from the UE, there may be an increase network overhead as control signaling is transported across the network. This may also result in an increase in network latency. This may affect network operations across a communication network, exacerbating load balancing and other network management challenges, as well as degrading the network performance perceived by users (e.g., user experience).

SUMMARY

Various aspects disclosed herein include methods that may be implemented on a processor of a network computing device for managing IMS registration of a UE. Various aspects may include sending to a home subscriber server (HSS) a user authorization request in response to receiving a registration request from the UE, receiving from the HSS a user authorization answer comprising subscriber location information associated with the UE, and sending a registration request to register the UE with a serving CSCF (S-CSCF) based on the subscriber location information and S-CSCF location information.

Some aspects may include selecting the S-CSCF based on the subscriber location information and S-CSCF location information. Some aspects may include selecting the S-CSCF from among a plurality of S-CSCFs based on location information associated with each S-CSCF and the subscriber location information associated with the UE. In some aspects, selecting the S-CSCF from among a plurality of S-CSCFs based on location information associated with each S-CSCF and the subscriber location information associated with the UE may include selecting from among the plurality of S-CSCFs an S-CSCF that is geographically closest to a location indicated in the subscriber location information associated with the UE. In some aspects, sending the registration request to register the UE with the S-CSCF based on the subscriber location information and S-CSCF location information may include sending the registration request to register the UE with the selected S-CSCF based on the S-CSCF location information and the subscriber location information associated with the UE. In some aspects, the subscriber location information may include a Location_ID field of the user authorization answer.

Some aspects may include determining that the S-CSCF is not available to register the UE, selecting a second selected S-CSCF based on the subscriber location information associated with the UE and S-CSCF location information of the second selected S-CSCF in response to determining that the S-CSCF is not available to register the UE, and sending a registration request to register the UE with the second S-CSCF based on the subscriber location information associated with the UE and the S-CSCF location information of the second selected S-CSCF. In some aspects, the registration request from the UE may include a re-registration request from the UE to re-associate the UE with a previously-associated S-CSCF. Such aspects may include comparing the subscriber location information associated with the UE and S-CSCF location information of the previously-associated S-CSCF, and selecting a second S-CSCF based on the comparison of the subscriber location information and the S-CSCF location information of the previously-associated S-CSCF and S-CSCF location information of the second selected S-CSCF. In some aspects, sending the registration request to register the UE with the S-CSCF based on the subscriber location information associated with the UE and S-CSCF location information may include sending the registration request to register the UE with the second selected S-CSCF.

Various aspects further include a network computing device having a processor configured with processor executable instructions to perform operations of any of the methods summarized above. Various aspects include a network computing device having means for performing functions of any of the methods summarized above. Various aspects include a non-transitory processor-readable storage medium having stored thereon processor-executable instructions configured to cause a processor of a network computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
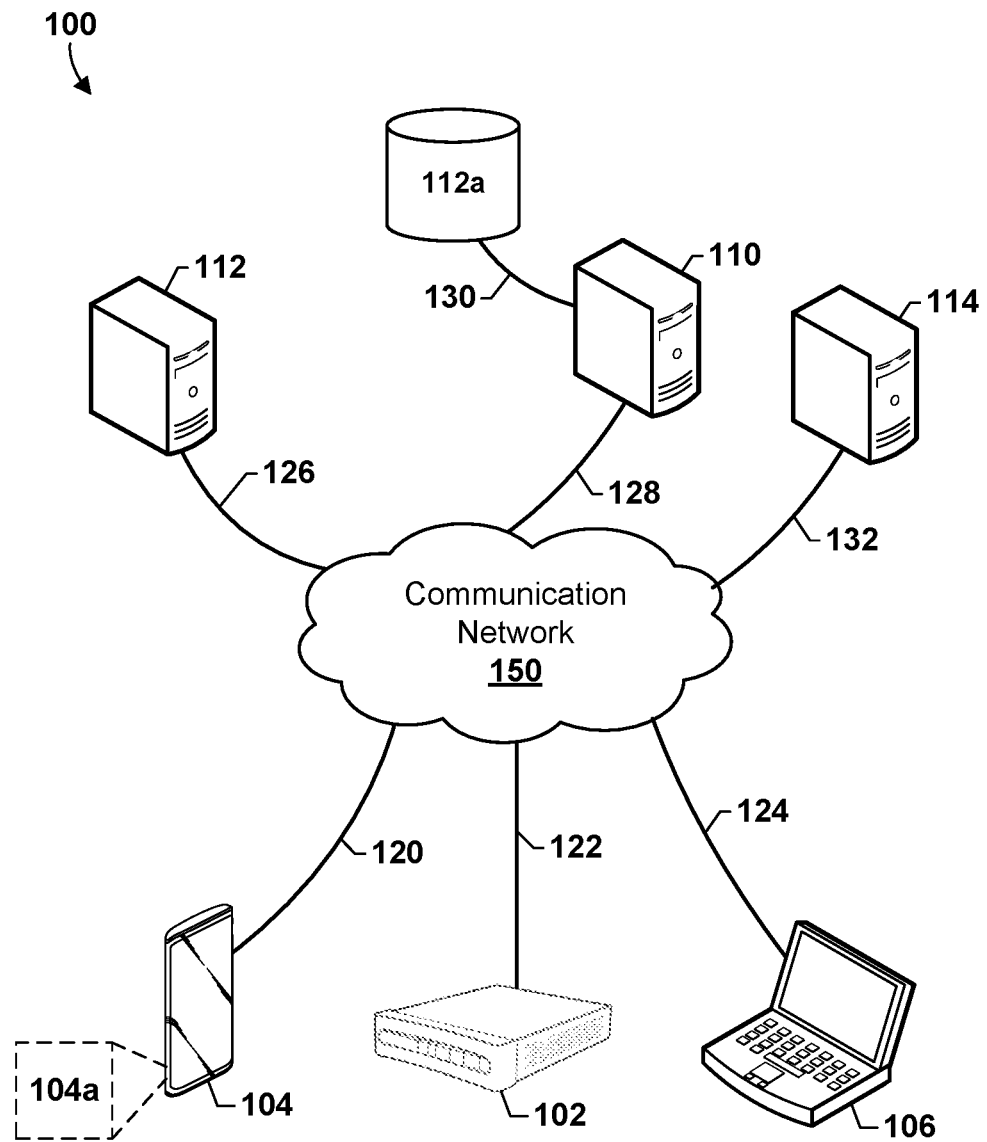
FIG. 1 is a system block diagram of a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of network elements such as servers, routers, set top boxes, head-end devices, and other similar network elements, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry, e.g., a smart ring or smart bracelet), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium.

An IMS includes various control functions, such as a Proxy Call Session Control Function, (P-CSCF), Interrogating Call Session Control Function (I-CSCF), and a Serving Call Session Control Function (S-CSCF). Each of these control functions may be configured to set up, establish, modify, and tear down multimedia sessions. In addition, each of these control functions may be performed by hardware, software, or a combination executing on a network computing device (i.e., an instantiation of the control function). Conventionally, there are insufficient controls over the assignment of control functions to a UE. In some cases, the IMS may assign to a UE a control function (e.g., an S-CSCF) that is geographically distant from the UE. Put another way, the IMS may assign to the UE a control function executing on a network computing device that is geographically remote from UE. For example, in instances in which the primary control function of a UE is unavailable or unreachable, a call request for the UE may be assigned to another control function that is being executed on a network computing device that is geographically distant from the UE. Consequently, the assignment to a UE of a control function that is geographically distant from the UE may increase network overhead as control signaling is transported across the network. This may also result in an increase network latency. This may affect network operations across a communication network, exacerbating load balancing and other network management challenges, as well as degrading the network performance perceived by users (e.g., user experience).

For example, the IMS may receive a call request for a UE that is not registered with the IMS. In such case, the IMS (e.g., an I-CSCF) may select an S-CSCF for default registration of the UE with the IMS. The selected S-CSCF may be in another geographic region or site from the UE. As another example, a UE may attempt to perform registration with the IMS, and the default S-CSCF for the UE, or a more local (i.e., geographically adjacent) S-CSCF, may be unavailable or unreachable. In such case, the IMS may select an S-CSCF that is another geographic region or site for registration of the UE with the IMS.

Various embodiments disclosed herein may enable a network computing device to manage IMS registration of a UE using geographic information of the UE to assign to the UE a control function (e.g., an S-CSCF) that is relatively geographically close to the UE. Assigning a relatively geographically close control function to the UE may improve operation of a communication network by decreasing network overhead and signaling latency. Assigning a relatively geographically close control function to the UE also may improve operation of the communication network by decreasing a complexity of network management required for network operations. Assigning a relatively geographically close control function to the UE also may improve operation of the communication network by improving the user experience of UEs using the communication network.

In various embodiments, a network computing device may execute one or more instances of IMS control functions, such as a P-CSCF, an I-CSCF, and/or an S-CSCF. In various embodiments, a network computing device (e.g., executing an I-CSCF) may receive a user authorization request (e.g., a SIP REGISTER message) from a UE (e.g., via a P-CSCF). In some embodiments, the network computing device may send to a home subscriber server (HSS) (or another suitable database or function) a user authorization request in response to receiving the registration request from the UE. The network computing device may receive from the HSS a user authorization answer comprising subscriber location information associated with the UE. The network computing device may send a registration request to register the UE with an S-CSCF based on the subscriber location information associated with the UE and S-CSCF location information.

In some embodiments, various functions of the IMS may be configured to process and/or store subscriber location information associated with the UE. In some embodiments, the subscriber location associated with the UE may be represented as an attribute such as "location_ID" or another suitable representation. In some embodiments, the HSS may be configured to store the subscriber location information associated with the UE in or with a subscriber profile associated with the UE. In some embodiments, the HSS and one or more other control functions of the IMS (e.g., the I-CSCF) may be configured to send, receive, convey, provide, etc. the subscriber location information associated with the UE as part of a message or signal, such as a user authorization request, a user authorization answer, and or another suitable message or signal.

In some embodiments, the network computing device may select the S-CSCF based on the subscriber location information associated with the UE and S-CSCF location information. In some embodiments, the network computing device may select the S-CSCF from among a plurality of S-CSCFs based on location information associated with each S-CSCF and the subscriber location information associated with the UE making the registration request. In some embodiments, the network computing device may be configured to select from among the plurality of S-CSCFs an S-CSCF that is geographically closest to a location indicated in the subscriber location information associated with the UE. In some embodiments, the network computing device may be configured to send the registration request to register the UE with the selected S-CSCF based on the S-CSCF location information and subscriber location information associated with the UE.

In some embodiments, the network computing device may determine that first selected S-CSCF is not available to register the UE. In some embodiments, the network computing device may select a second S-CSCF based on the subscriber location information associated with the UE and S-CSCF location information of the second selected S-CSCF in response to determining that the first selected S-CSCF is not available to register the UE. In some embodiments, the network computing device may send a registration request to register the UE with the second selected S-CSCF based on the subscriber location information and the S-CSCF location information of the second selected S-CSCF.

In some embodiments, the network computing device may receive from the UE a re-registration request. In some embodiments, the UE may be configured to initiate a re-registration procedure by sending a new registration request. In some embodiments, the UE may be configured to perform periodic application level re-registration, for example, to refresh an existing registration, in response to a change in a registration status of the UE, or upon the occurrence of another trigger condition or trigger event. In some embodiments, the UE may be configured to initiate re-registration in response to determining that a capability of the UE has changed. In some embodiments, the UE and/or the network computing device may be configured to perform re-registration in response to determining that a UE handover has occurred. In some embodiments, the network computing device may compare the subscriber location information associated with the UE and S-CSCF location information of the previously-associated S-CSCF. In some embodiments, the network computing device may select a second S-CSCF based on the comparison of the current subscriber location information associated with the UE and the S-CSCF location information of the previously-associated S-CSCF and S-CSCF location information of the second selected S-CSCF. In some embodiments, the network computing device may be configured to send the registration request to register the UE with the second selected S-CSCF.

Various embodiments may be implemented within a variety of communication systems 100, an example of which is illustrated in FIG. 1. With reference to FIG. 1, the communication system 100 may include various user equipment (UE) such as a set top box (STB) 102, a mobile device 104, a computer 106. In addition, the communication system 100 may include network elements such as a computing devices 110, 112, and 114, and a communication network 150. The STB 102, the mobile device 104, the computer 106, and the computing devices 110, 112, and 114 may communicate with the communication network 150 via a respective wired or wireless communication link 120, 122, 124, 126, 128 and 132. The computing device 110 may communicate with a data store 112a via a wired or wireless communication link 130.

The STB 102 may include customer premises equipment, which may be implemented as a set top box, a router, a modem, or another suitable device configured to provide functions of an STB. The mobile device 104 may include any of a variety of portable computing platforms and communication platforms, such as cell phones, smart phones, Internet access devices, and the like. The computer 106 may include any of a variety of personal computers, desktop computers, laptop computers, and the like.

The computing device 110 may be configured to perform operations related to management of IMS registration of a UE (e.g., set top box (STB) 102, a mobile device 104, a computer 106). Registration of the UE with the IMS may enable the UE to utilize and/or access multimedia information and/or services over the communication network 150. In some embodiments, the multimedia information and/or services may be provided, for example, by the computing devices 112 and 114. In some embodiments, the computing devices 112 and 114 may include an application server configured to provide or support multimedia information and/or services. In some embodiments, the multimedia information and/or services may include communication services (e.g. VOLTE) between and/or among the UEs (e.g., set top box (STB) 102, a mobile device 104, a computer 106).

The STB 102, the mobile device 104, and the computer 106 may each include a processor or processing device that may execute one or more client applications (e.g., client application 104a). In some embodiments, the client application 104a may be configured to perform operations involving the sending and/or receiving of information, which may include multimedia information, via an IMS of the communication network 150.

The communication network 150 may support wired and/or wireless communication among the STB 102, the mobile device 104, the computer 106, and the computing devices 110, 112, and 114. The communication network 150 may include one or more additional network elements, such as servers and other similar devices (not illustrated). The communication system 100 may include additional network elements to facilitate communication among the STB 102, the mobile device 104, the computer 106, and the computing devices 110, 112, and 114. The communication links 120, 122, 124, 126, 128, 130 and 132 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Wired communication protocols may use a variety of wired networks (e.g., Ethernet, TV cable, telephony, fiber optic and other forms of physical network connections) that may use one or more wired communication protocols, such as Data Over Cable Service Interface Specification (DOCSIS), Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

The wireless and/or wired communication links 120, 122, 124, 126, 128, 130 and 132 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 120, 122, 124, 126, 128, 130 and 132 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
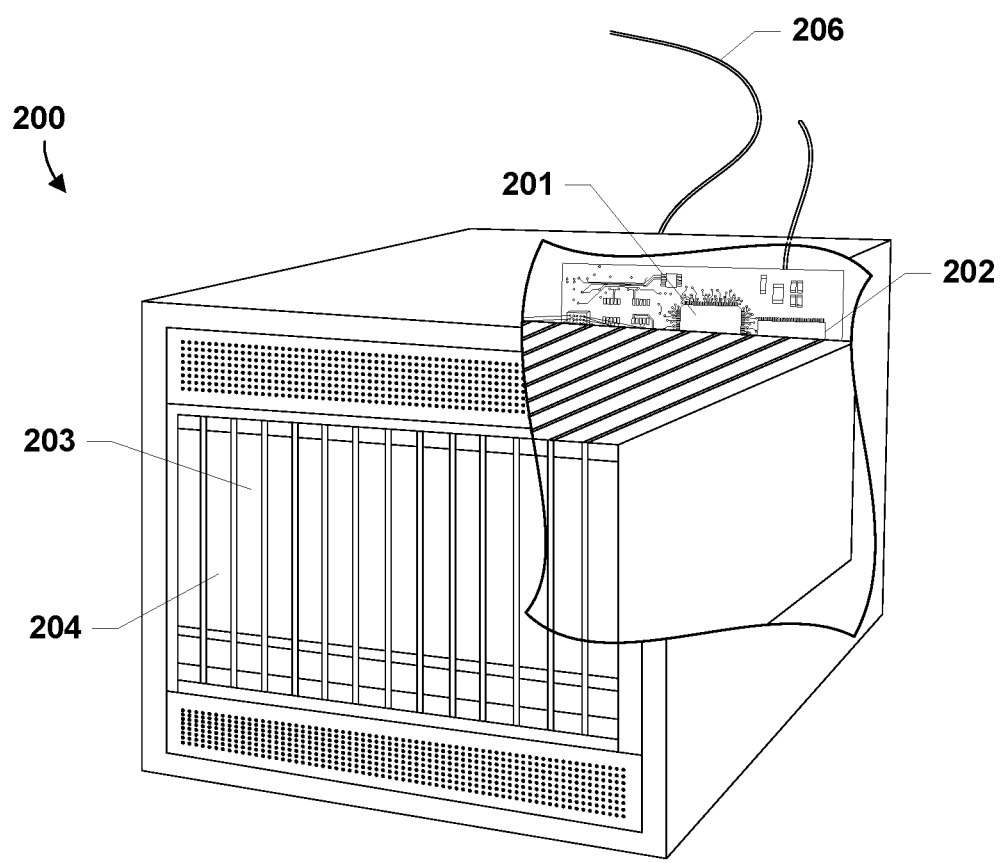
FIG. 2 is a component block diagram illustrating components of a network computing device element suitable for implementing various embodiments.

Various embodiments may use a computing device as a server, router, or another suitable element of a communication network. Such network elements may typically include at least the components illustrated in FIG. 2, which illustrates an example network computing device 200. With reference to FIGS. 1 and 2, the network computing device 200 (e.g., the computing devices 110, 112, and 114) may include a processor 201 coupled to volatile memory 202 and a large capacity nonvolatile memory, such as a disk drive 203. The network computing device 200 may also include a peripheral memory access device such as a floppy disc drive, compact disc (CD) or digital video disc (DVD) drive 204 coupled to the processor 201. The network computing device 200 may also include network access ports 206 (or interfaces) coupled to the processor 201 for establishing data connections with a network, such as the Internet and/or a local area network coupled to other system computers and servers. Similarly, the network computing device 200 may include additional access ports, such as USB, Firewire, Thunderbolt, and the like for coupling to peripherals, external memory, or other devices.

Figure 3:
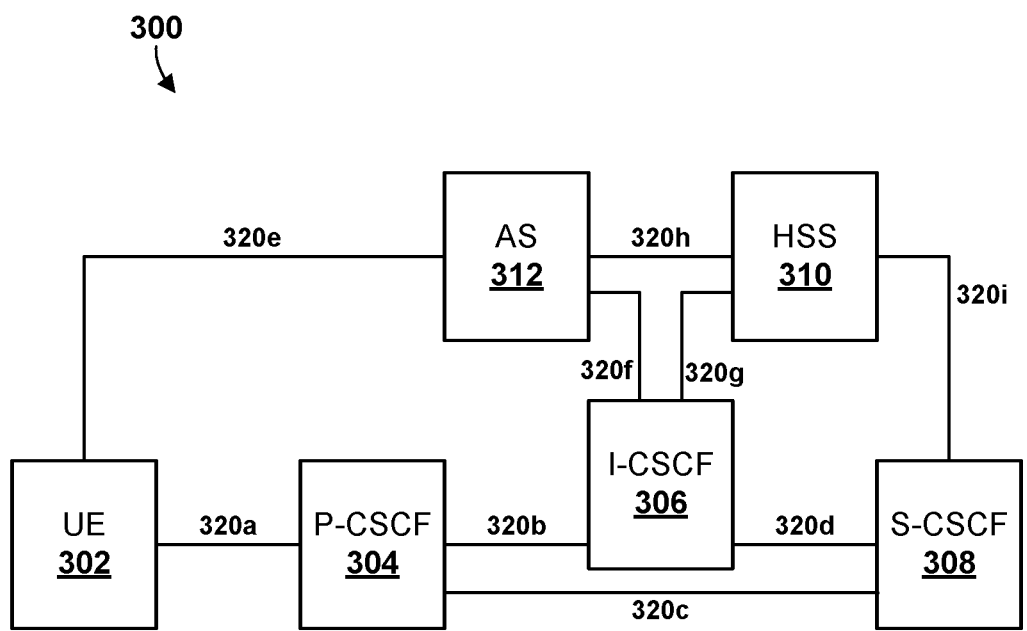
FIG. 3 is a system block diagram illustrating aspects of an IP Multimedia Subsystem (IMS) suitable for implementing various embodiments.

FIG. 3 is a system block diagram illustrating aspects of an IMS 300 suitable for implementing various embodiments. With reference to FIGS. 1-3, the IMS 300 may include a UE 302 (e.g., 102, 104, 106), a P-CSCF 304, an I-CSCF 306, an S-CSCF 308, and HSS 310, and an application server (AS) 312. In some embodiments, each of the P-CSCF 304, I-CSCF 306, S-CSCF 308, HSS 310, and AS 312 may be instantiated on one or more network computing devices (e.g., 110, 112, 114, 200). In some embodiments, each of the UE 302, P-CSCF 304, I-CSCF 306, S-CSCF 308, HSS 310, and AS 312 may communicate with one another as illustrated via a communication link such as an interface 320a, 320b, 320c, 320d, 320e, 320f, 320g, 320h, and 320i. In some embodiments, the IMS 300 may include a call session control function (CSCF) that includes the P-CSCF 304, the I-CSCF 306, and the S-CSCF 308, each configured to perform various functions of the CSCF.

The P-CSCF 304 may be configured to perform an edge access function to receive a request from the UE 302 for services from the IMS 300. The P-CSCF 304 may be configured to function as a proxy by accepting such a request and forwarding the request a network control function or entity configured to receive and process the request. In some embodiments, the request may include a registration request. In some embodiments, the request may include an invitation for a multimedia session. In some embodiments, the P-CSCF 304 may provide updates to the S-CSCF 308 on a network access utilized by the UE 302. In some embodiments, the P-CSCF 304 may be configured to perform a Policy and Charging Rules Function (PCRF), and to maintain a secure communication link with the UE 302.

In some embodiments, the I-CSCF 306 may be configured to determine or select an S-CSCF 308 to manage an IMS session requested by the UE 302. As further described below, the I-CSCF 306 may be configured to obtain a request for an address of the S-CSCF 308 (e.g., a domain name) from the HSS 310 during a process of registration or re-registration of the UE 302 with the IMS 300. In some embodiments, the I-CSCF 306 may be configured to route messages (e.g., SIP signaling) to the selected S-CSCF 308, e.g., during such registration or re-registration process, to assign the S-CSCF 308 to the UE 302. In some embodiments, I-CSCF 306 may be configured to query the HSS 310 to determine information associated with the UE 302, which may include subscriber location information, as further described below.

In some embodiments, the S-CSCF 308 may be configured to perform operations as the primary node in the IMS 300 responsible for session control on behalf of the UE 302. In some embodiments, the I-CSCF 306 may assign the S-CSCF 308 to the UE 302 as part of an IMS registration procedure. In some embodiments, the S-CSCF 308 may obtain and/or receive a subscriber profile that is associated with the UE 302 from the HSS 310, e.g., as part of the IMS registration procedure for the UE 302. In some embodiments, the S-CSCF 308 may determine an appropriate AS 312 for a service requested by the UE 302, and may forward (conduct) appropriate signaling to the AS 312.

In some embodiments, the HSS 310 may be configured to perform operations as a master database for the UE 302, and may store information such as a subscriber profile associated with the UE 302. In some embodiments, subscriber-related information stored in the HSS 310 may include user identification, security, location and subscription profile information. In some embodiments, the HSS 310 also may store subscriber location information associated with the UE 302.

Figure 4:
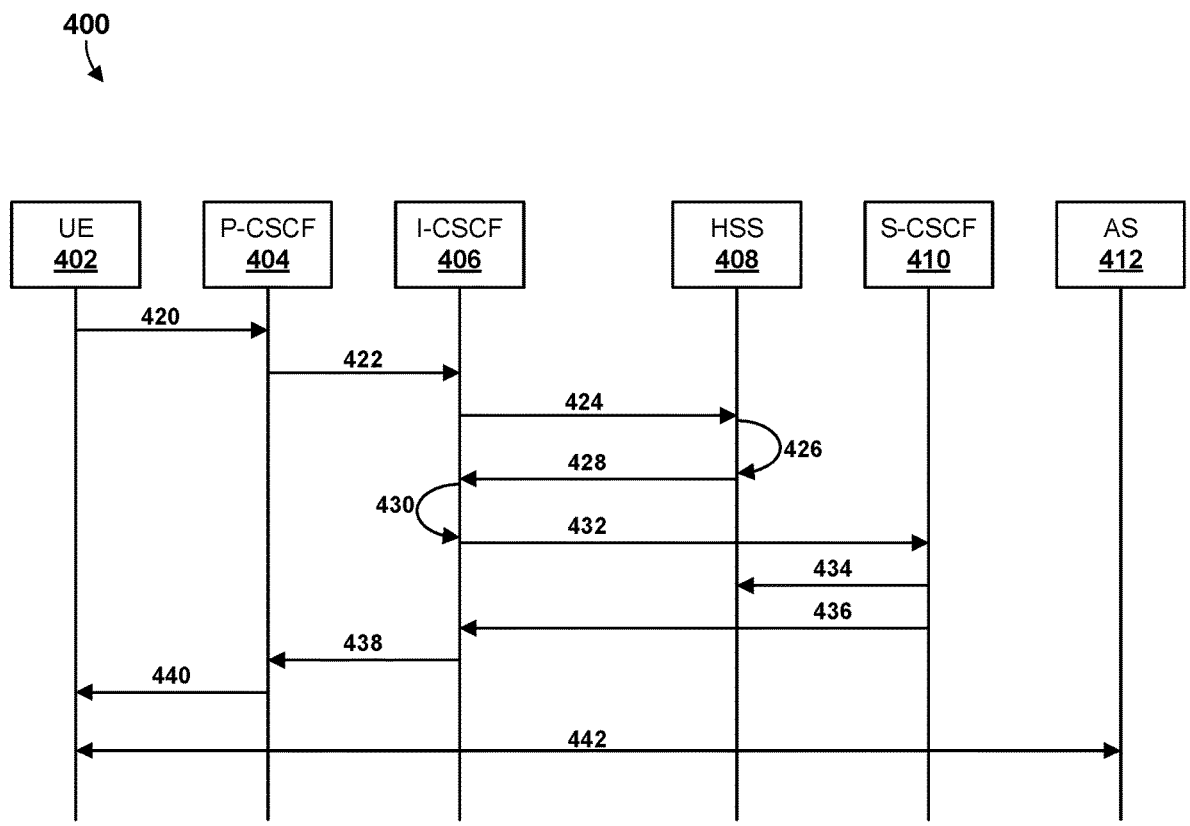
FIG. 4 is a call flow diagram illustrating a method 400 for managing IMS registration of a UE in accordance with various embodiments.

FIG. 4 is a call flow diagram illustrating a message flow 400 for managing IMS registration of a UE in accordance with various embodiments. In some embodiments, the method 400 may be useful in an initial IMS registration process. With reference to FIGS. 1-4, the operations of the message flow 400 may be performed by a processor or processing device of a UE 302 (e.g., 102, 104, 106), a P-CSCF 304, an I-CSCF 306, an HSS 310, an S-CSCF 308, and an application server (AS) 312. In some embodiments, the UE 302, the P-CSCF 304, the I-CSCF 306, the HSS 310, the S-CSCF 308, and the AS 312 may send or receive signals or messages according to a suitable signaling protocol such as SIP, Diameter, and/or another suitable protocol.

To initiate an IMS registration process, the UE 302 may send a registration request message 420 to the P-CSCF 304. The P-CSCF 304 may send (or pass) a registration request 422 to the I-CSCF 306.

In response to receiving the registration request message 422, the I-CSCF 306 may send to the HSS 310 a user authorization request 424. Based on the registration request message 424, in operation 426 the HSS 310 may obtain or retrieve from memory subscriber information associated with the UE 302. In some embodiments, the subscriber information may include subscriber location information associated with the subscriber's UE. In some embodiments, the subscriber location information may indicate a geographic location or a geographic preference associated with the UE 302. In some embodiments, the subscriber information may be configured to include a subscriber location information attribute in a subscriber profile associated with the UE 302. In some embodiments, the subscriber location information attribute may be represented as "Location_ID" or any other suitable representation. In some embodiments, the subscriber location information may be used to determine or identify an appropriate S-CSCF (e.g., the S-CSCF 308) for the UE 302. In some embodiments, various elements and functions, such as the HSS 310 and the I-CSCF 306, may be configured to obtain, handle, and/or process the subscriber location information attribute. The HSS 310 may send to the I-CSCF 306 a user authorization answer 428. In some embodiments, the user authorization answer may include the subscriber location information associated with the UE 302. In some embodiments, the user authorization answer also may include mandatory capability information and/or optional capability information that is associated with the UE 302. In some embodiments, the user authorization answer does not include information identifying a specific S-CSCF (or S-CSCFs).

In operation 430, the I-CSCF 306 may select or determine an appropriate S-CSCF (e.g., the S-CSCF 308) for the UE 302 based on the subscriber location information associated with the UE 302 and first selected S-CSCF 308 location information. In some embodiments, the I-CSCF 306 may be configured to obtain or retrieve (e.g., from a memory device) a data structure such as a table, a list, a database, and/or the like that includes identifiers of one or more S-CSCFs and location information (e.g., geographic location information) associated with the one or more S-CSCFs. In some embodiments, the S-CSCF location information attribute may be represented as "Location_ID" or any other suitable representation. In some embodiments, the data structure may include Fully Qualified Domain Names (FQDNs) of each of the one or more S-CSCFs and the location information associated with the one or more S-CSCFs.

In some embodiments, in operation 430, the I-CSCF 306 may select or determine two or more S-CSCFs based on the subscriber location information and S-CSCF location information. In some embodiments, the I-CSCF 306 may determine or select S-CSCF(s) associated with location information that is within a threshold distance from the subscriber location information. In some embodiments, the threshold distance may be a geographic distance. In some embodiments, the threshold distance may be a "distance" within a communication network, such as a number of hops, a number of network elements interposed between the UE 302 and an S-CSCF, a ping threshold, a latency threshold, a packet loss threshold, or another suitable metric of a communication network. In some embodiments, the I-CSCF 306 may determine or select S-CSCF(s) 308 associated with location information that indicates a same (or proximate) geographic area or region, network area or region, or another suitable area or region, as the subscriber location information.

In some embodiments, in operation 430, the I-CSCF 306 may select or determine two or more S-CSCFs based on the subscriber location information, the S-CSCF location information, and the mandatory capability information and/or optional capability information that is associated with the UE 302. For example, in some embodiments, the I-CSCF 306 may select or determine two or more S-CSCFs (e.g., 308) based on the subscriber location information associated with the UE 302 and the S-CSCF 308 location information (e.g., as described above), and then may select from among the two or more S-CSCFs an S-CSCF based on the mandatory capability information and/or optional capability information that is associated with the UE 302. For example, the I-CSCF 306 may match capability information of an S-CSCF 308 with the mandatory capability information and/or optional capability information that is associated with the UE 302 to select an S-CSCF (e.g., the S-CSCF 308) from among the two or more S-CSCFs. In some embodiments, the I-CSCF 306 may select an S-CSCF 308 that is geographically closest to a location indicated in the subscriber location information associated with the UE 302.

The I-CSCF 306 may send a registration request 432 to the selected S-CSCF 308. In some embodiments, the I-CSCF 306 may send the registration request 432 register the UE 302 with the first selected S-CSCF 308 based on the S-CSCF 308 location information and subscriber location information associated with the UE 302. The S-CSCF 308 may send to the HSS 310 a message 434 including information to be stored by the HSS 310, such as the assignment or association of the S-CSCF 308 to the UE 302. In some embodiments, the S-CSCF 308 may use registration information about the UE 302 to register the UE 302 to the IMS 300. In some embodiments, the HSS 310 may send such information about the UE 302 to the S-CSCF 308 in the relayed message 432. In some embodiments, the HSS 310 may send such information about the UE 302 to the S-CSCF 308 in another message (not illustrated).

The S-CSCF 308 may send to the I-CSCF 306 an acknowledgment message 436 (e.g., a SIP 200 OK message). The I-CSCF 306 may send to the P-CSCF 304 an acknowledgment message 438 (e.g., a SIP 200 OK message). The P-CSCF 304 may send to the UE 302 an acknowledgment message 440 (e.g., a SIP 200 OK message). Subsequently, the UE 302 and the AS 312 may exchange communications 442 related to a service or information requested by or provided to the UE 302.

Figure 5:
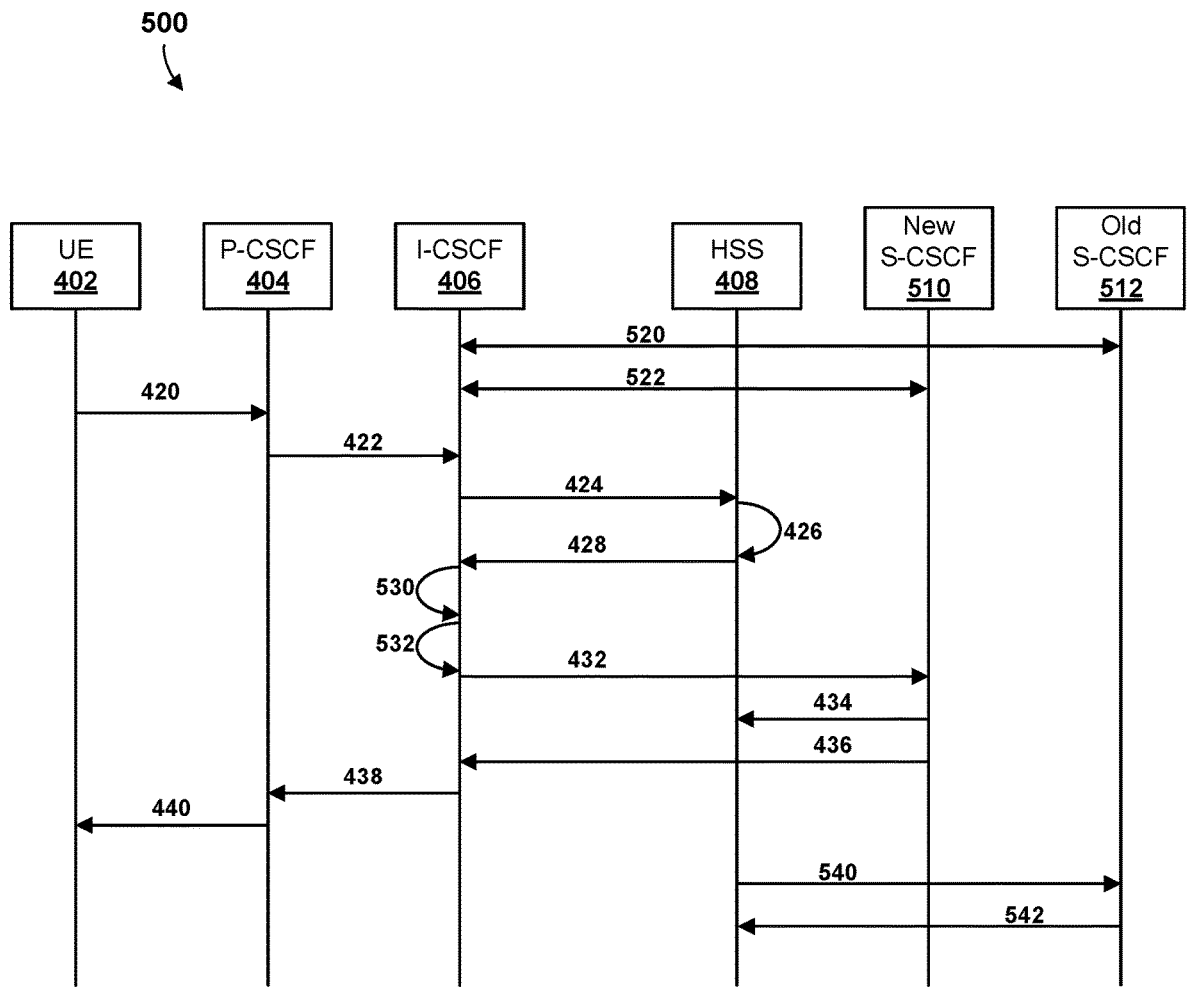
FIG. 5 is a call flow diagram illustrating a method 500 for managing IMS registration of a UE in accordance with various embodiments.

FIG. 5 is a call flow diagram illustrating a call message flow 500 for managing IMS registration of a UE 302 in accordance with various embodiments. In some embodiments, the call message flow 500 may be useful in an IMS re-registration process. With reference to FIGS. 1-5, the operations of the call message flow 500 may be performed by a processor or processing device of the UE 302, the P-CSCF 304, the I-CSCF 306, the HSS 310, a new S-CSCF 508 (e.g., 308), and an old S-CSCF 512 (e.g., 308). In some embodiments, the UE 302, the P-CSCF 304, the I-CSCF 306, the HSS 310, the new S-CSCF 508, and the old S-CSCF 512 may send or receive signals or messages according to a suitable signaling protocol such as SIP, Diameter, and/or another suitable protocol.

From time to time, the I-CSCF 306 may obtain or receive an indication of operational status from S-CSCFs (e.g., 308). For example, the I-CSCF 306 may receive status information 520 from the old S-CSCF 512 (which may be S-CSCF 308), and may receive status information 522 from the old S-CSCF 512. In various embodiments, the status information 520 and 522 may indicate an availability or reachability of the new S-CSCF 508 and old S-CSCF 512, respectively, for association with the UE 302. In some embodiments, the old S-CSCF 512 may be initially associated with the UE 302 (e.g., through an IMS registration process, such as the call message flow 400).

From time to time, a UE 302 and an IMS 300 may perform re-registration of the UE 302 with the IMS 300. In some situations, the UE 302 may initiate a re-registration process, e.g., by sending a new registration request message to the P-CSCF (e.g., the P-CSCF 304). In some situations, the IMS 300 may initiate re-registration of the UE 302. For example, an S-CSCF (e.g., old S-CSCF 512) may send a signal or message to the UE 302 that causes the UE 302 to send a new registration request message. In some embodiments, the old S-CSCF 512 may reduce an expiration time of the UE's registration with the IMS 300.

In some embodiments, in an IMS re-registration process, substantially as described above, the UE 302 may send a registration request message 420 to the P-CSCF 304, the P-CSCF 304 may send (or pass) a registration request 422 to the I-CSCF 306, the I-CSCF 306 may send to the HSS 310 a user authorization request 424, the HSS 310 may obtain or retrieve from memory subscriber information associated with the UE 302 in operation 426. The HSS 310 may send to the I-CSCF 306 a user authorization answer 428. In some embodiments, the user authorization answer may include the subscriber location information associated with the UE 302. In some embodiments, the user authorization answer also may include mandatory capability information and/or optional capability information that is associated with the UE 302. In some embodiments, the user authorization answer does not include information identifying a specific S-CSCF (or S-CSCFs).

In operation 530, the I-CSCF 306 may determine that the old (current) S-CSCF 512 is not available to register (e.g., for association with) the UE 302 (for example, based on the status information 520). In operation 532, the I-CSCF 306 may select or determine an appropriate new S-CSCF (e.g., the new S-CSCF 508) for the UE 302 based on the subscriber location information associated with the UE 302 and S-CSCF (e.g., 308, 508, 512) location information. In some embodiments, the I-CSCF 306 may compare the subscriber location information associated with the UE 302 and S-CSCF location information of the old/current S-CSCF 512 (i.e., the previously-associated S-CSCF 512). In some embodiments, the I-CSCF 306 may select a second S-CSCF (e.g., the new S-CSCF 508) based on the comparison of the subscriber location information associated with the UE 302 and the S-CSCF location information of the previously-associated S-CSCF (e.g., the old S-CSCF 512) and S-CSCF location information of the second S-CSCF (e.g., the new S-CSCF 508).

In some embodiments, the I-CSCF 306 may be configured to obtain or retrieve (e.g., from a memory device) a data structure such as a table, a list, a database, and/or the like that includes identifiers of one or more S-CSCFs (e.g., 308, 508, 512) and location information (e.g., geographic location information) associated with the one or more S-CSCFs (e.g., 308, 508, 512). In some embodiments, the S-CSCF (e.g., 308, 508, 512) location information attribute may be represented as "Location_ID" or any other suitable representation. In some embodiments, the data structure may include Fully Qualified Domain Names (FQDNs) of each of the one or more S-CSCFs and the location information associated with the one or more S-CSCFs. In some embodiments, some operations performed by the I-CSCF 306 in operation 532 may be similar to operations performed by I-CSCF 306 in operation 430 (FIG. 4) as described.

In various embodiments, substantially as described, the I-CSCF 306 may send a registration request 432 to the selected new S-CSCF 508, the S-CSCF 508 may send to the I-CSCF 306 an acknowledgment message 436, the I-CSCF 306 may send to the P-CSCF 304 an acknowledgment message 438, and the P-CSCF 304 may send to the UE 302 an acknowledgment message 440. In some embodiments, the HSS 310 may send to the old S-CSCF 512 a registration termination request message 540 indicate that the old S-CSCF 512 is no longer associated with the UE 302. The old S-CSCF 512 may send to the HSS 310 a registration termination answer message 542 to acknowledge that the old S-CSCF 512 is no longer associated with the UE 302.

Figure 6:
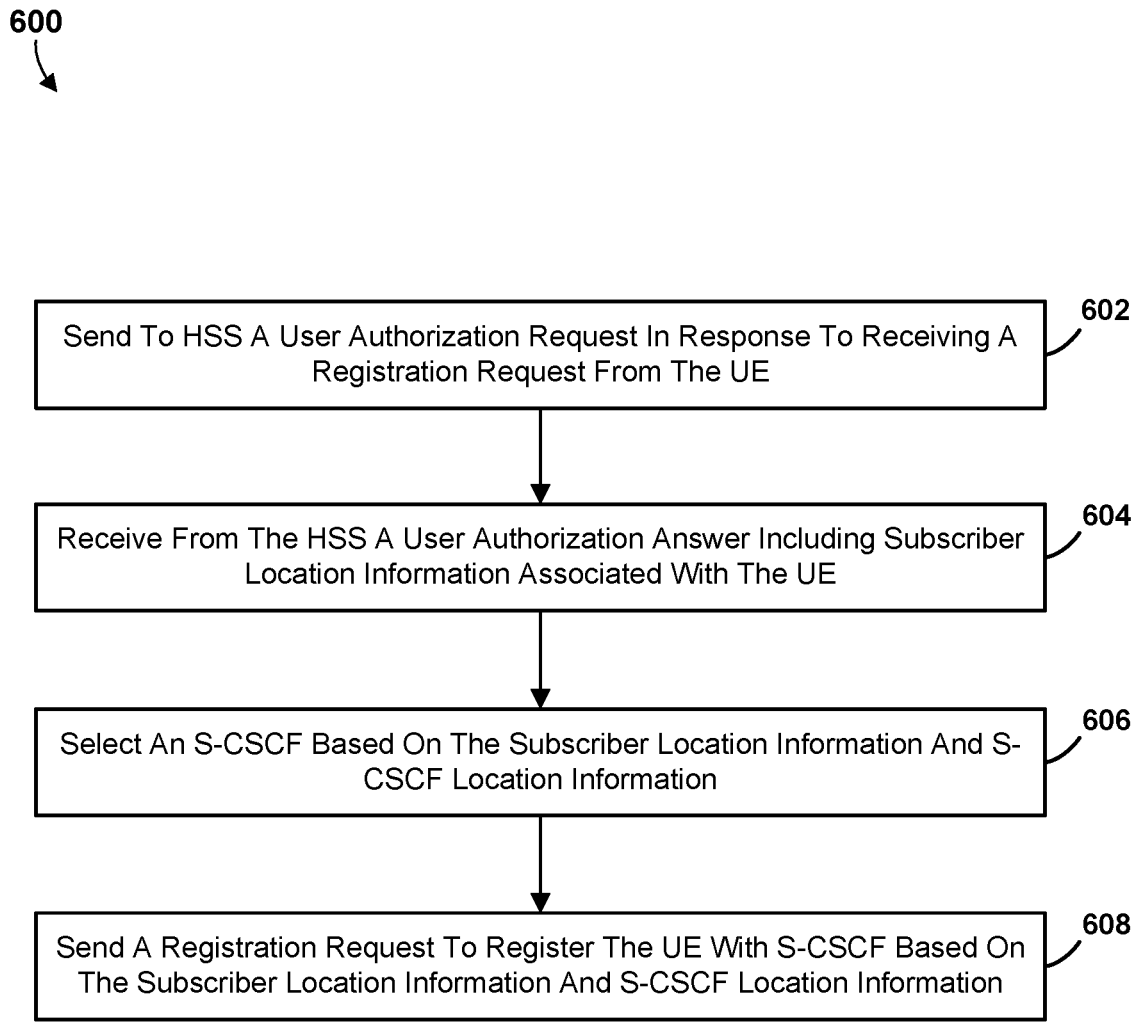
FIG. 6 is a process flow diagram illustrating a method 600 for managing IMS registration of a UE according to various embodiments.

FIG. 6 is a process flow diagram illustrating a method 600 for managing IMS registration of a UE 302 according to various embodiments. With reference to FIGS. 1-6, the operations of the method 600 may be implemented in hardware components and/or software components of a computing device (e.g., the computing device 110, 112, 114, 200, 304, 306, 308) the operation of which may be controlled by one or more processors (e.g., the processor 201 and/or the like), referred to herein as a "processor."

In block 602, the processor may send to an HSS 310 a user authorization request in response to receiving a registration request from a UE (e.g., 102, 104, 106, 302).

In block 604, the processor may receive from the HSS 310 a user authorization answer comprising subscriber location information associated with the UE 302. In some embodiments, the HSS 310 may be configured to store, retrieve, and provide subscriber information associated with the UE 302. In some embodiments, the subscriber information may be configured to include a subscriber location information attribute in a subscriber profile associated with the UE 302. In some embodiments, the subscriber location information attribute may be represented as "Location_ID" or any other suitable representation.

In block 606, the processor may select an S-CSCF (e.g., 308, 508, 512) based on the subscriber location information and S-CSCF location information. In some embodiments, the processor may select or determine an appropriate S-CSCF (e.g., 308, 508, 512) for the UE 302 based on the subscriber location information and S-CSCF (e.g., 308, 508, 512) location information. In some embodiments, the processor may be configured to obtain or retrieve (e.g., from a memory device) a data structure such as a table, a list, a database, and/or the like that includes identifiers of one or more S-CSCFs (e.g., 308, 508, 512) and location information (e.g., geographic location information) associated with the one or more S-CSCFs (e.g., 308, 508, 512). In some embodiments, the S-CSCF (e.g., 308, 508, 512) location information attribute may be represented as "Location_ID" or any other suitable representation.

In block 608, the processor may send a registration request to register the UE 302 with an S-CSCF (e.g., 308,

508, 512) based on the subscriber location information and S-CSCF location information.

Figure 7A:
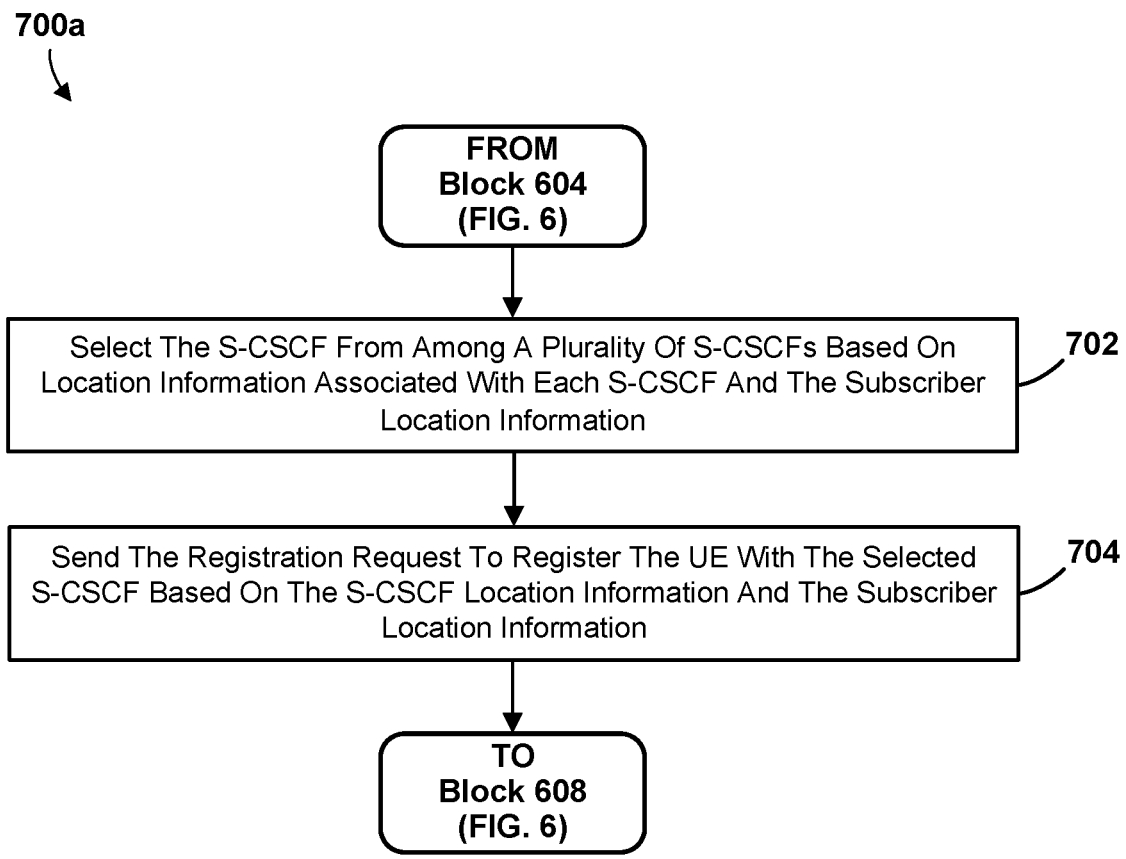
FIGS. 7A-7C are process flow diagrams illustrating operations that may be performed as part of a method for managing IMS registration of a UE according to various embodiments.
Figure 7B:
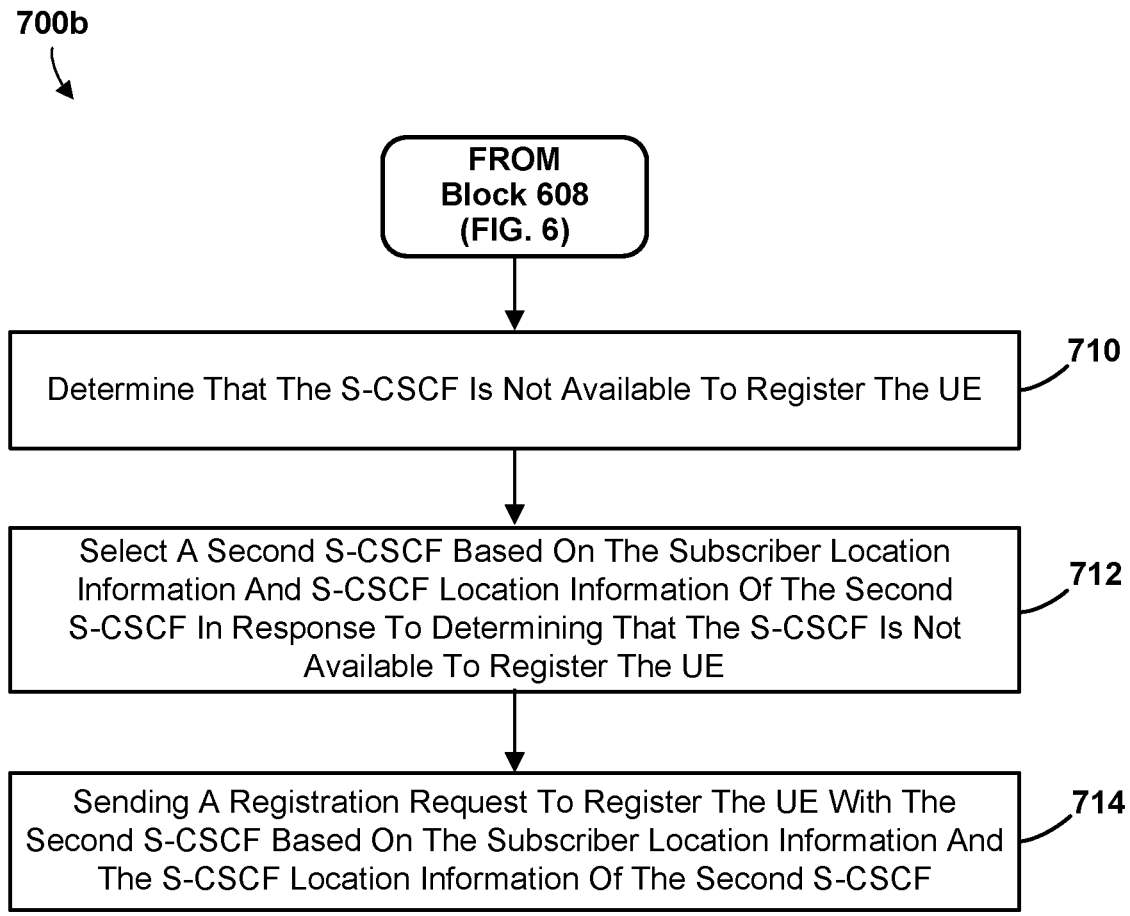
Figure 7C:
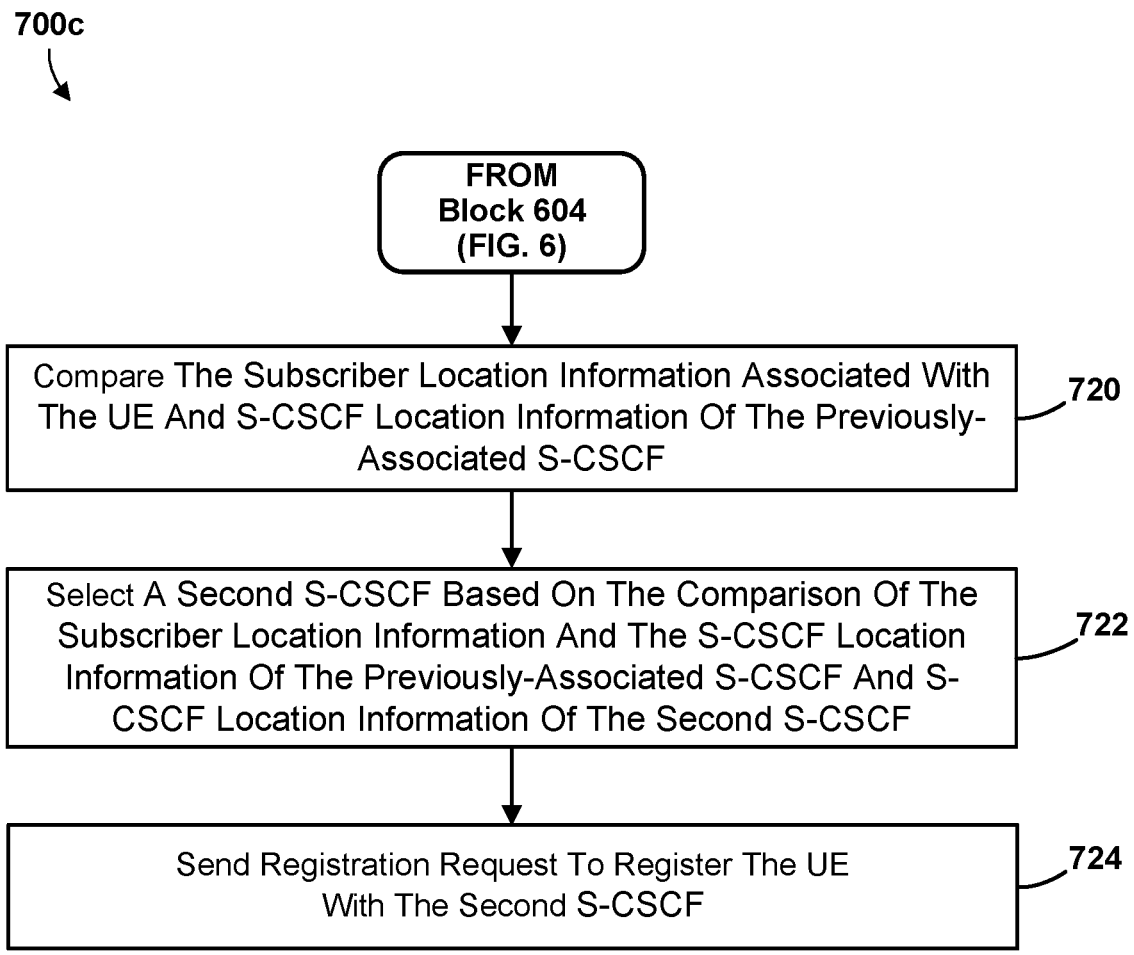

FIGS. 7A-7C are process flow diagrams illustrating operations 700*a*-700*c* that may be performed as part of a method 600 for managing IMS registration of a UE according to various embodiments. With reference to FIGS. 1-7D the operations 700*a*-700*d* may be implemented in hardware components and/or software components of a computing device (e.g., the computing device 110, 112, 114, 200, 304, 306, 308) the operation of which may be controlled by one or more processors (e.g., the processor 201 and/or the like), referred to herein as a "processor."

Referring to FIG. 7A, after performing the operations of block 604 (FIG. 6) as described, the processor may select the S-CSCF (e.g., 308, 508, 512) from among a plurality of S-CSCFs (e.g., 308, 508, 512) based on location information associated with each S-CSCF (e.g., 308, 508, 512) and the subscriber location information in block 702. In some embodiments, the processor may select from among the plurality of S-CSCFs an S-CSCF that is geographically closest to a location indicated in the subscriber location information.

In block 704, the processor may send the registration request to register the UE with the selected S-CSCF (e.g., 308, 508, 512) based on the S-CSCF location information and the subscriber location information.

The processor may then perform the operations of block 608 (FIG. 6) as described.

Referring to FIG. 7B, after performing the operations of block 608 (FIG. 6) as described, the processor may determine that the S-CSCF (e.g., 308, 508, 512) is not available to register the UE 302 in block 710. For example, based on status information (e.g., 520, 522) received from the S-CSCF, the processor may determine that the S-CSCF (e.g., 308, 508, 512) is not available to register the UE.

In block 712, the processor may select a second S-CSCF (e.g., 308, 508, 512) based on the subscriber location information and S-CSCF location information of the second S-CSCF in response to determining that the first selected S-CSCF (e.g., 308, 508, 512) is not available to register the UE.

In block 714, the processor may send a registration request to register the UE 302 with the second selected S-CSCF (e.g., 308, 508, 512) based on the subscriber location information associated with the UE 302 and the S-CSCF location information of the second selected S-CSCF.

Referring to FIG. 7C, after performing the operations of block 604 (FIG. 6) as described, the processor may compare the subscriber location information associated with the UE 302 and S-CSCF location information of the previously-associated S-CSCF (e.g., S-CSCF 512) in block 720. For example, the processor may compare subscriber location information associated with the UE 302 and S-CSCF location information of the old S-CSCF 512.

In block 722, the processor may select a second S-CSCF (e.g., 308, 508, 512) based on the comparison of the subscriber location information associated with the UE 302 and the S-CSCF location information of the previously-associated S-CSCF (e.g., 512) and S-CSCF location information of the second S-CSCF (e.g., 508). For example, the processor may select a second S-CSCF (e.g., the new S-CSCF 508) based on the comparison of the subscriber location information (e.g., associated with the UE 302) and the S-CSCF location information of the previously-associated S-CSCF (e.g., the old S-CSCF 512) and S-CSCF location information of the second S-CSCF (e.g., the new S-CSCF 508).

In block 724, the processor may send the registration request to register the UE 302 with the second selected S-CSCF (e.g., 508).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more operations of the methods and operations 400, 500, 600, and 700*a*-700*c* may be substituted for or combined with one or more operations of the methods and operations 400, 500, 600, and 700*a*-700*c*.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of managing IP Multimedia Subsystem (IMS) registration of a user equipment (UE) performed by a network computing device, comprising:
    sending to a home subscriber server (HSS) a user authorization request in response to receiving a registration request from the UE;
    receiving from the HSS a user authorization answer comprising subscriber location information associated with the UE;
    sending a registration request to register the UE with a serving Call Session Control Function (S-CSCF) based on the subscriber location information associated with the UE and S-CSCF location information;
    initiating, at the network computing device, a first re-registration request to the S-CSCF to re-register the UE with the S-CSCF in response to at least one of:
        a determination of time to perform periodic application level re-registration;
        a change in a registration status of the UE;
        an occurrence of trigger condition or trigger event;
        a determination that a capability of the UE has changed; or
        a determination that a UE handover has occurred;
    determining that the S-CSCF is not available to register the UE;
    selecting a previously-associated S-CSCF based on the subscriber location information associated with the UE and S-CSCF location information of the previously-associated S-CSCF in response to determining that the S-CSCF is not available to register the UE; and
    sending a second re-registration request to re-associate the UE with the previously-associated S-CSCF.

2. The method of claim 1, further comprising selecting the S-CSCF based on the subscriber location information and S-CSCF location information.

3. The method of claim 1, further comprising selecting the S-CSCF from among a plurality of S-CSCFs based on location information associated with each S-CSCF and the subscriber location information associated with the UE.

4. The method of claim 3, wherein selecting the S-CSCF from among a plurality of S-CSCFs based on location information associated with each S-CSCF and the subscriber location information associated with the UE comprises selecting from among the plurality of S-CSCFs an S-CSCF that is geographically closest to a location indicated in the subscriber location information associated with the UE.

5. The method of claim 3, wherein sending the registration request to register the UE with the S-CSCF based on the subscriber location information and S-CSCF location information comprises sending the registration request to register the UE with the selected S-CSCF based on the S-CSCF location information and the subscriber location information associated with the UE.

6. The method of claim 1, wherein the subscriber location information comprises a Location_ID field of the user authorization answer.

7. The method of claim 1, further comprising:
    selecting a different S-CSCF based on the subscriber location information associated with the UE and S-CSCF location information of the different S-CSCF; and
    sending a registration request to register the UE with the different S-CSCF based on the subscriber location information associated with the UE and the S-CSCF location information of the different S-CSCF.

8. The method of claim 1, wherein the second re-registration request from the network computing device comprises a UE re-registration request from the UE to re-associate the UE with the previously-associated S-CSCF, the method further comprising:
    comparing, at the network computing device, the subscriber location information associated with the UE and S-CSCF location information of the previously-associated S-CSCF; and
    selecting the previously-associated S-CSCF based on the comparison of the subscriber location information and the S-CSCF location information of the previously-associated S-CSCF.

9. The method of claim 8, wherein selecting the previously-associated S-CSCF based on the subscriber location information associated with the UE and S-CSCF location information comprises sending the second re-registration request to register the UE with the previously-associated S-CSCF.

10. A network computing device, comprising:
    a processor configured with processor-executable instructions to perform operations comprising:
        sending to a home subscriber server (HSS) a user authorization request in response to receiving a registration request from a user equipment (UE);
        receiving from the HSS a user authorization answer comprising subscriber location information associated with the UE;
        sending a registration request to register the UE with a serving Call Session Control Function (S-CSCF)

based on the subscriber location information associated with the UE and S-CSCF location information;
initiating, at the network computing device, a first re-registration request to the S-CSCF to re-register the UE with the S-CSCF in response to at least one of:
a determination of time to perform periodic application level re-registration;
a change in a registration status of the UE;
an occurrence of trigger condition or trigger event;
a determination that a capability of the UE has changed; or
a determination that a UE handover has occurred;
determining that the S-CSCF is not available to register the UE;
selecting a previously-associated S-CSCF based on the subscriber location information associated with the UE and S-CSCF location information of the previously-associated S-CSCF in response to determining that the S-CSCF is not available to register the UE; and
sending a second re-registration request to re-associate the UE with the previously-associated S-CSCF.

11. The network computing device of claim 10, wherein the processor is configured with processor-executable instructions to perform operations further comprising selecting the S-CSCF based on the subscriber location information and S-CSCF location information.

12. The network computing device of claim 10, wherein the processor is configured with processor-executable instructions to perform operations further comprising selecting the S-CSCF from among a plurality of S-CSCFs based on location information associated with each S-CSCF and the subscriber location information associated with the UE.

13. The network computing device of claim 12, wherein the processor is configured with processor-executable instructions to perform operations such that selecting the S-CSCF from among a plurality of S-CSCFs based on location information associated with each S-CSCF and the subscriber location information associated with the UE comprises selecting from among the plurality of S-CSCFs an S-CSCF that is geographically closest to a location indicated in the subscriber location information associated with the UE.

14. The network computing device of claim 12, wherein the processor is configured with processor-executable instructions to perform operations such that sending the registration request to register the UE with the S-CSCF based on the subscriber location information and S-CSCF location information comprises sending the registration request to register the UE with the selected S-CSCF based on the S-CSCF location information and the subscriber location information associated with the UE.

15. The network computing device of claim 10, wherein the processor is configured with processor-executable instructions to perform operations such that the subscriber location information comprises a Location_ID field of the user authorization answer.

16. The network computing device of claim 10, wherein the processor is configured with processor-executable instructions to perform operations further comprising:
selecting a different S-CSCF based on the subscriber location information associated with the UE and S-CSCF location information of the different S-CSCF; and
sending a registration request to register the UE with the different S-CSCF based on the subscriber location information associated with the UE and the S-CSCF location information of the different S-CSCF.

17. The network computing device of claim 10, wherein the processor is configured with processor-executable instructions to perform operations such that the second re-registration request from the network computing device comprises a UE re-registration request from the UE to re-associate the UE with the previously-associated S-CSCF, and
wherein the processor is configured with processor-executable instructions to perform operations further comprising:
comparing, at the network computing device, the subscriber location information associated with the UE and S-CSCF location information of the previously-associated S-CSCF; and
selecting the previously-associated S-CSCF based on the comparison of the subscriber location information and the S-CSCF location information of the previously-associated S-CSCF.

18. The network computing device of claim 17, wherein the processor is configured with processor-executable instructions to perform operations such that selecting the previously-associated S-CSCF based on the subscriber location information associated with the UE and S-CSCF location information comprises sending the second re-registration request to register the UE with the previously-associated S-CSCF.

19. A non-transitory processor-readable medium having stored thereon processor-executable instruction configured to cause a processor of a network computing device to perform operations comprising:
sending to a home subscriber server (HSS) a user authorization request in response to receiving a registration request from a user equipment (UE);
receiving from the HSS a user authorization answer comprising subscriber location information associated with the UE;
sending a registration request to register the UE with a serving Call Session Control Function (S-CSCF) based on the subscriber location information associated with the UE and S-CSCF location information;
initiating, at the network computing device, a first re-registration request to the S-CSCF to re-register the UE with the S-CSCF in response to at least one of:
a determination of time to perform periodic application level re-registration;
a change in a registration status of the UE;
an occurrence of trigger condition or trigger event;
a determination that a capability of the UE has changed; or
a determination that a UE handover has occurred;
determining that the S-CSCF is not available to register the UE;
selecting a previously-associated S-CSCF based on the subscriber location information associated with the UE and S-CSCF location information of the previously-associated S-CSCF in response to determining that the S-CSCF is not available to register the UE; and
sending a second re-registration request to re-associate the UE with the previously-associated S-CSCF.

20. The non-transitory processor-readable medium of claim 19, wherein the stored processor-executable instructions are configured to cause a processor of a network computing device to perform operations further comprising selecting the S-CSCF based on the subscriber location information and S-CSCF location information.

21. The non-transitory processor-readable medium of claim 19, wherein the stored processor-executable instructions are configured to cause a processor of a network computing device to perform operations further comprising selecting the S-CSCF from among a plurality of S-CSCFs based on location information associated with each S-CSCF and the subscriber location information associated with the UE.

22. The non-transitory processor-readable medium of claim 21, wherein the stored processor-executable instructions are configured to cause a processor of a network computing device to perform operations such that selecting the S-CSCF from among a plurality of S-CSCFs based on location information associated with each S-CSCF and the subscriber location information associated with the UE comprises selecting from among the plurality of S-CSCFs an S-CSCF that is geographically closest to a location indicated in the subscriber location information associated with the UE.

23. The non-transitory processor-readable medium of claim 21, wherein the stored processor-executable instructions are configured to cause a processor of a network computing device to perform operations such that sending the registration request to register the UE with the S-CSCF based on the subscriber location information and S-CSCF location information comprises sending the registration request to register the UE with the selected S-CSCF based on the S-CSCF location information and the subscriber location information associated with the UE.

24. The non-transitory processor-readable medium of claim 19, wherein the stored processor-executable instructions are configured to cause a processor of a network computing device to perform operations such that the subscriber location information comprises a Location_ID field of the user authorization answer.

25. The non-transitory processor-readable medium of claim 19, wherein the stored processor-executable instructions are configured to cause a processor of a network computing device to perform operations further comprising:
    selecting a different S-CSCF based on the subscriber location information associated with the UE and S-CSCF location information of the different S-CSCF; and
    sending a registration request to register the UE with the different S-CSCF based on the subscriber location information associated with the UE and the S-CSCF location information of the different S-CSCF.

26. The non-transitory processor-readable medium of claim 19, wherein
    the stored processor-executable instructions are configured to cause a processor of a network computing device to perform operations such that the second re-registration request from the network computing device comprises a UE re-registration request from the UE to re-associate the UE with the previously-associated S-CSCF, and
    wherein the stored processor-executable instructions are configured to cause a processor of a network computing device to perform operations further comprising:
        comparing the subscriber location information associated with the UE and S-CSCF location information of the previously-associated S-CSCF; and
        selecting a different S-CSCF based on the comparison of the subscriber location information and the S-CSCF location information of the previously-associated S-CSCF.

27. The non-transitory processor-readable medium of claim 26, wherein the stored processor-executable instructions are configured to cause a processor of a network computing device to perform operations such that selecting the S-CSCF based on the subscriber location information associated with the UE and S-CSCF location information comprises sending the second re-registration request to register the UE with the previously-associated S-CSCF.

* * * * *